(No Model.)
D. RYLANDS.
RECEPTACLE FOR PRESERVED MEAT.
No. 473,349. Patented Apr. 19, 1892.
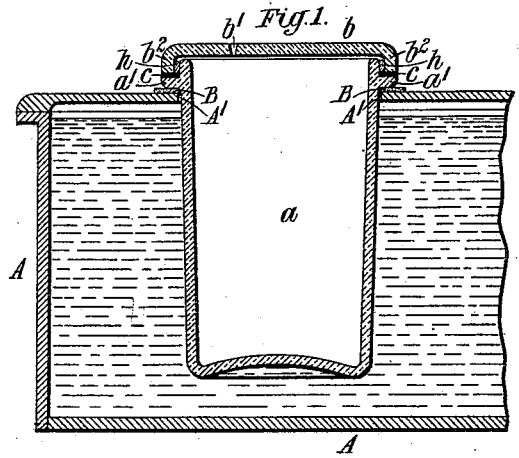
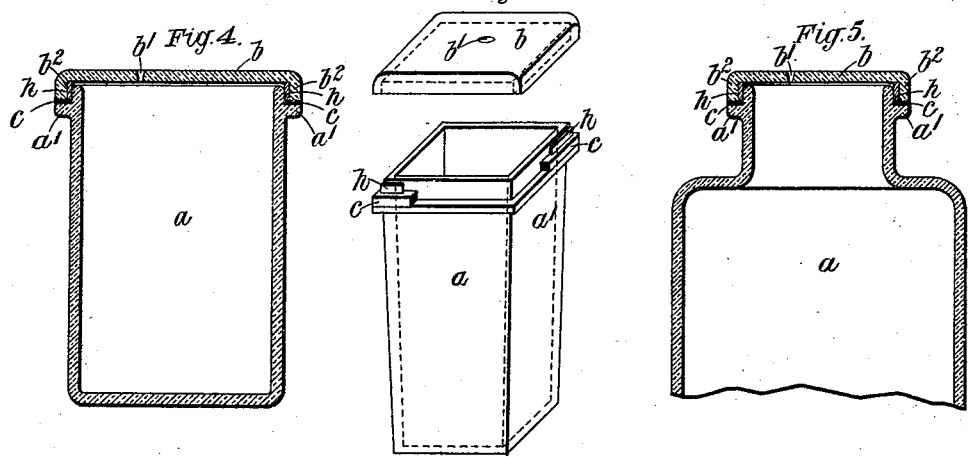
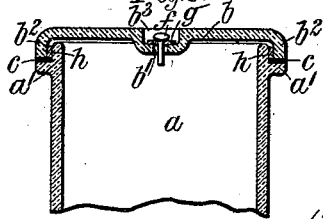 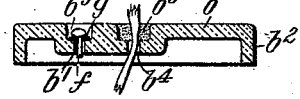
Witnesses:—
J. A. Rutherford
Robert Everett
Inventor:
Dan Rylands
By James L. Norris
Attorney

United States Patent Office.

DAN RYLANDS, OF STAIRFOOT, ENGLAND.

RECEPTACLE FOR PRESERVED MEAT.

SPECIFICATION forming part of Letters Patent No. 473,349, dated April 19, 1892.

Application filed September 14, 1891. Serial No. 405,649. (No model.)

*To all whom it may concern:*

Be it known that I, DAN RYLANDS, glass-bottle manufacturer, a subject of the Queen of Great Britain, and a resident of Stairfoot, England, have invented certain new and useful Improvements in Receptacles for Preserved Meat and other Substances, of which the following is a specification, reference being had to the accompanying drawings.

My invention relates to jars, bottles, and similar receptacles for containing fish, meat, fruits, vegetables, and other substances for the purpose of preserving the same, and is designed to provide receptacles which are more convenient and advantageous for this purpose than those heretofore employed.

My improved jar, bottle, or other receptacle is made of glass or similar material, with an external flange a short distance below the mouth thereof, and is provided with a lid or cover having a downwardly-extending flange, which surrounds the mouth of the jar or receptacle and between which and the said external flange is placed india-rubber or other suitable packing or jointing material, so that a vacuum or partial vacuum may be formed within the jar or receptacle, and the lid or cover will be securely held thereon by the external pressure of the atmosphere without the aid of any fastening devices. By dispensing with fastening devices I obtain the advantage that if in any case a proper vacuum is not created in the jar or receptacle this fact may be readily ascertained, as the lid or cover will in such case not be held tightly upon the said jar or receptacle.

To prevent contact of the contents of the jar or receptacle with the said india-rubber or other jointing material, I place around the upper edge or mouth of the said jar or receptacle, above the external flange thereof, a ring or a strip of cork, paper, or other suitable material which is not liable to injuriously affect the contents of the jar or receptacle. This ring or strip fits tightly into the lid or cover when the latter is in place and prevents access of the contents of the jar or receptacle to the india-rubber or other jointing material.

I make the lid or cover of glass or other suitable material and form therein a hole, which will permit the escape of air and steam from the jar or receptacle when the contents thereof are boiled or through which the air may be exhausted by an air-pump or by other convenient means. This hole may be sealed or stopped with wax, cement, or similar material to effect the hermetical closing of the jar or receptacle; or I provide an automatic valve for closing the said hole. For stopping this vent-hole I find it advantageous in some instances to drop into the same a small round or other suitably-shaped piece of glass or similar material before pouring or dropping in the wax, cement, or the like. Moreover, when I use a self-acting valve I prefer to cover the said valve with wax, cement, or the like to more effectually insure the fluid-tight closing of the jar or receptacle.

My improved jar or receptacle can at any time be readily opened by simply removing the wax or other material from the hole in the lid or cover or by opening the valve, and thus permitting the entrance of air and destroying the vacuum within the receptacle; or the said lid or cover can be raised by means of any suitable instrument inserted between it and the external flange of the jar or receptacle.

The jar or receptacle is made in such a manner as to facilitate the operation of boiling its contents. For this purpose, in addition to making the said jar or receptacle with an external flange, as above mentioned, I so form the said jar or receptacle that it can be inserted in a hole in the top or cover of a vessel or bath, and when it is so inserted the said flange will rest upon the top or cover of the said vessel or bath, suitable packing or jointing material being placed between the said flange and the top of the bath to prevent the escape of steam between these parts.

In the accompanying drawings, Figure 1 is a vertical central section showing one form of my improved jar or receptacle placed in a bath such as I use for boiling the contents of the said receptacles when used for preserving meat and similar substances. Fig. 2 is a perspective view of a pyramidal jar or receptacle, the lid or cover thereof being shown detached from the same and a portion of the jointing-ring being cut away. Fig. 3 is a vertical central section showing one of my improved jars or receptacles having a self-acting valve for closing the hole in the lid or cover. Fig. 4 is a vertical central section of a cylindrical jar constructed like the jar shown in Fig. 1. Fig. 5 is a vertical central section showing another modification of my invention, and Fig. 6 is a vertical central section illustrating a further modification of my said invention.

$a$ is the jar or receptacle. $b$ is the lid or cover of the same, which is provided with a hole $b'$ for the escape of the air.

$c$ is the packing or jointing material for forming a fluid-tight joint between the external flange $a'$ of the said jar or receptacle and the lid or cover $b$.

Referring to Fig. 1, A is a bath such as I use for boiling the contents of the receptacles. The top or cover of this bath is provided with holes, as at A′, to receive the said receptacles, so that the latter will be immersed in the liquid contained in the said bath.

Between the external flange $a'$ and the top or cover of the bath A is placed suitable packing or jointing material B, such as asbestos or similar material, which will form a steam-tight joint, but which will not be injuriously affected by the heat. The ring or annular piece $c$ of india-rubber or other jointing material surrounds the upper end of the said receptacle $a$ and rests upon the flange $a'$ thereof. The lid or cover $b$ is made with a downwardly-extending rim or flange $b^2$, which, when the said lid or cover is in place upon the jar or receptacle $a$, surrounds the mouth of the latter and bears upon the ring $c$ of packing or jointing material.

To prevent contact of the contents of the jar with the india-rubber or other jointing-ring $c$, I place around the mouth of the jar in a vertical position a ring $h$, of paper, cork, or similar material, upon which the lid or cover will fit tightly, thus preventing access of the contents of the jar to the said ring $c$.

Any suitable device may be used for holding down the lid or cover $b$ upon the jar or receptacle $a$ during the boiling of the contents thereof, and thus keeping the said jar or receptacle fluid-tight with the exception of the air-hole $b'$, and at the same time squeezing the packing or jointing material B between the flange $a'$ and the top or cover of the bath A, so as to prevent the escape of steam around the jar or receptacle $a$. When the boiling of the contents has been effected, the hole $b'$ is sealed or stopped by means of sealing-wax or cement; a small ball or other suitably shaped piece of glass or similar material being, by preference, dropped into the said hole prior to the introduction of the wax or cement therein, so as to more effectually close the said hole and to prevent the dropping of the wax or cement through the hole into the jar or receptacle. When the contents of the jar or receptacle are cooled, the vacuum thus formed within the said jar or receptacle will be sufficient to hold the lid or cover $b$ securely thereon without the aid of fastening devices of any kind, and the aforesaid holding-down device may be removed and the jar or receptacle withdrawn from the bath A. As this bath and the said holding-down device form no part of my present invention, I do not deem it necessary to give any further description of them in this specification.

Fig. 2 shows a jar $a$ similar to that shown in Fig. 1, but of pyramidal form. If the substance to be kept in my improved jar or receptacle does not require to be boiled, the air can be exhausted from the said jar or receptacle by means of an air-pump or other suitable exhausting apparatus. When the vacuum is to be formed in the jar or receptacle in this manner, I provide a self-acting valve for closing the hole in the lid or cover.

In Fig. 3 I have shown a lid or cover provided with a valve $f$ for this purpose. This valve is formed with a suitable stem, which can be passed through the hole $b'$ in the lid or cover $b$ and with a rounded or other suitably-shaped head, which cannot pass through the said hole. A ring or washer $g$ of india-rubber or other suitable material is arranged beneath the head of the valve and serves to insure the fluid-tight closing of the hole by the said valve. The lid or cover $b$ is made with a recess $b^3$ to receive wax or cement to cover the valve $f$. This valve may be either in the center of the lid, as shown in Fig. 3, or in any other convenient position.

In Fig. 6 the lid or cover $b$ is provided with a central hole $b^4$ to receive the stem or stalk of a bunch of grapes or other fruit, which stem or stalk is secured in the said hole by means of wax or cement inserted in a recess or cavity $b^5$. I thus provide for suspending fruit within the jar or receptacle so as to more effectually insure its preservation.

In the forms or modifications of my invention (shown in Figs. 1 to 4 of the drawings) the jar or receptacle has no internal shoulder. It is obvious, however, that in cases where it is not necessary that the contents of the jar or receptacle should retain their molded shape after removal from the said jar or receptacle the latter may be of any desired internal form—that is to say, it may be made either with an internal shoulder, as shown in Fig. 5, or otherwise. If desired, a paper or other cover or label may be pasted over the lid and another label be pasted around the adjacent edges of the lid or cover of the jar or receptacle.

What I claim is—

The combination of a jar $a$, having an external flange $a'$ a short distance below the mouth thereof, a washer $c$, resting upon the said flange, a ring $h$, of cork or the like, surrounding the upper edge of the said jar above the said washer $c$, and a cover $b$, having a downwardly-extending flange $b^2$, which fits tightly upon the said ring $h$ and bears against the washer $c$, the said cover having a plain hole $b'$ for egress of air and adapted to be hermetically closed by wax or the like and another hole $b^4$ with a recess $b^5$ round the same for wax or cement to seal a stalk in the said hole $b^4$, substantially as and for the purposes specified.

In testimony whereof I have hereunto signed my name in the presence of two subscribing witnesses.

DAN RYLANDS.

Witnesses:
 THOS. JOHNSON,
 AARON BOSTWICK.